(12) United States Patent
Kimiyama et al.

(10) Patent No.: US 8,483,239 B2
(45) Date of Patent: Jul. 9, 2013

(54) IP BROADCAST SYSTEM, AND MULTIPLEXER, RECEIVING APPARATUS AND METHOD USED IN IP BROADCAST SYSTEM

(75) Inventors: Kenji Kimiyama, Sagamihara (JP); Yoshiro Osaki, Kawasaki (JP); Naoko Satoh, Hachioji (JP); Tetsuo Maeda, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 161 days.

(21) Appl. No.: 12/049,081

(22) Filed: Mar. 14, 2008

(65) Prior Publication Data

US 2008/0232361 A1    Sep. 25, 2008

(30) Foreign Application Priority Data

Mar. 20, 2007 (JP) .................. 2007-072365
Feb. 29, 2008 (JP) .................. 2008-050835

(51) Int. Cl.
*H04J 3/16* (2006.01)
*H04J 3/22* (2006.01)

(52) U.S. Cl.
USPC ........................................ 370/471

(58) Field of Classification Search
USPC .............. 370/471, 514, 474, 467, 473, 470, 370/477
See application file for complete search history.

(56) References Cited

U.S. PATENT DOCUMENTS

| | | | | |
|---|---|---|---|---|
| 5,291,486 A | * | 3/1994 | Koyanagi | 370/541 |
| 6,275,507 B1 | * | 8/2001 | Anderson et al. | 370/487 |
| 6,925,092 B1 | * | 8/2005 | Derks et al. | 370/465 |
| 7,002,993 B1 | | 2/2006 | Mohaban et al. | |
| 7,054,267 B2 | * | 5/2006 | Ramanan et al. | 370/229 |
| 2002/0003799 A1 | * | 1/2002 | Tomita | 370/392 |
| 2008/0114890 A1 | | 5/2008 | Kurihara et al. | |

FOREIGN PATENT DOCUMENTS

| | | | |
|---|---|---|---|
| CN | 1341317 A | | 3/2002 |
| GB | 2 259 229 A | | 3/1993 |
| JP | 10-051750 | | 2/1998 |
| JP | 2001-053703 | | 2/2001 |
| JP | 2001053703 A | * | 2/2001 |
| JP | 2001-359059 | | 12/2001 |

(Continued)

OTHER PUBLICATIONS

Osaki et al.; "Broadcast System, and Its Distribution Device and Terminal Device", U.S. Appl. No. 11/892,679, filed Aug. 27, 2007.

(Continued)

*Primary Examiner* — Mark Rinehart
*Assistant Examiner* — Maharishi Khirodhar
(74) *Attorney, Agent, or Firm* — Finnegan, Henderson, Farabow, Garrett & Dunner, LLP (57) ABSTRACT

According to one embodiment, an IP broadcast system includes a transmitting side and a receiving side connected to the transmitting side through a broadcast network on an IP network. The transmitting side includes a multiplexer which generates a standardized multiplex frame including at least a header field and an information field by multiplexing a plurality of RTP packets. The receiving side includes a buffer which temporarily holds the multiplex frame from the broadcast network and a program reproducer which retrieves and analyzes the multiplex frame from the buffer, extracts a reproduction clock shared by a plurality of programs, demultiplexes a plurality of TSs for each program from the multiplex frame, and based on the reproduction clock, reproduces the programs from each TS.

8 Claims, 6 Drawing Sheets

FOREIGN PATENT DOCUMENTS

| | | |
|---|---|---|
| JP | 2002-009832 | 1/2002 |
| JP | 2006-060631 | 3/2006 |
| JP | 2007-329606 | 12/2007 |

OTHER PUBLICATIONS

Notice of Reasons for Rejection, mailed Feb. 24, 2009, in Japanese Patent Application No. 2008-050835 and English translation thereof (4 pages total).

Hoffman D. et al., "IETF RFC: 2250—RTP Payload Format for MPEG1/MPEG2 Video", Jan. 1998, available from http://www.ietf.org/rfc/rfc2250.txt?number=2250.

Thompson B. et al., "IETF RFC: 4170—Tunneling Multiplexed Compressed RTP (TCRPT)", Nov. 2005, available from http://www.ietf.org/rfc/rfc4170.txt?number=4170.

Combined Search and Examination Report under Sections 17 and 18(3), mailed Jun. 23, 2008, in United Kingdom Patent Application No. GB0804631.0.

Decision of Rejection, mailed May 26, 2009, from the Japanese Patent Office in Japanese Patent Application No. 2008-050835 (1 page) and English translation thereof (2 pages).

U.S. Appl. No. 12/041,135, filed Mar. 3, 2008, to Osaki.

Third Office Action in Chinese Patent Application No. 200810085281.X, issued from the Chinese Patent Office, Jun. 24, 2011, and English-language translation thereof (14 pages).

Official Action from the Canadian Patent Office, dated Jul. 15, 2010, in Canadian Patent Application No. 2,625,025 (4 pages).

\* cited by examiner

IP BROADCAST SYSTEM, AND MULTIPLEXER, RECEIVING APPARATUS AND METHOD USED IN IP BROADCAST SYSTEM

CROSS-REFERENCE TO RELATED APPLICATIONS

This application is based upon and claims the benefit of priority from Japanese Patent Applications No. 2007-072365, filed Mar. 20, 2007; and No. 2008-050835, filed Feb. 29, 2008, the entire contents of both of which are incorporated herein by reference.

BACKGROUND

1. Field

One embodiment of the present invention relates to an IP broadcast system for broadcasting a TS (transport stream) of a plurality of programs through an IP broadcast network from a broadcast station to a broadcast receiver, and a multiplexer, a receiving apparatus and method used in the IP broadcast system.

2. Description of the Related Art

In recent years, the use of an IP broadcast system has extended for transmission of the broadcast contents to the users of the broadcast receivers through an IP network in addition to the transmission of the broadcast contents on a broadcast wave to the broadcast receivers from a broadcast station. Also, in the IP network, a large-capacity quality-controlled wide-area broadcast network called contents distribution network (CDN) or next-generation network (NGN) has come to be used widely. In these networks, the coded data of high-definition images are transmitted, and applications include video on demand (VOD) and IP broadcast programs.

Normally, a user datagram protocol (UDP) stream independent for each program is transmitted without multiplexing. In this case or especially in the case where a plurality of simultaneous programs are received by a set-top box (reproducing apparatus) for the IP broadcast, the requirement must be met for the process of simultaneous reception of a plurality of UDP streams, and the set-top box is correspondingly complicated, leading to an increased cost.

Although a method of multiplexing a plurality of programs using a transport stream (TS) according to Moving Picture Experts Group 2 (MPEG2) is available, the simultaneous processing of programs is complicated and a delay is caused.

In the normal network, the packet length is limited. In CDN or NGN, on the other hand, packets of some length have come to be transmitted as they are. A long packet can improve the throughput (transmission efficiency). The conventional packet length of about 1500 bytes, however, cannot exhibit the network performance sufficiently.

In the prior art, a communication terminal device (Jpn. Pat. Appln. KOKOAI Publication No. 2006-60631) and a network relay device (Jpn. Pat. Appln. KOKOAI Publication No. 2002-9832) are available for reducing the network load by multiplexing and transmitting a plurality of packets in one frame.

In the communication terminal device and the network relay device described above, a plurality of packets are multiplexed in one frame for communication but the TSs of a plurality of programs are not multiplexed as in the IP broadcast system described above.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

An embodiment of the invention will be explained in detail below with reference to the drawings.

Figure 1:
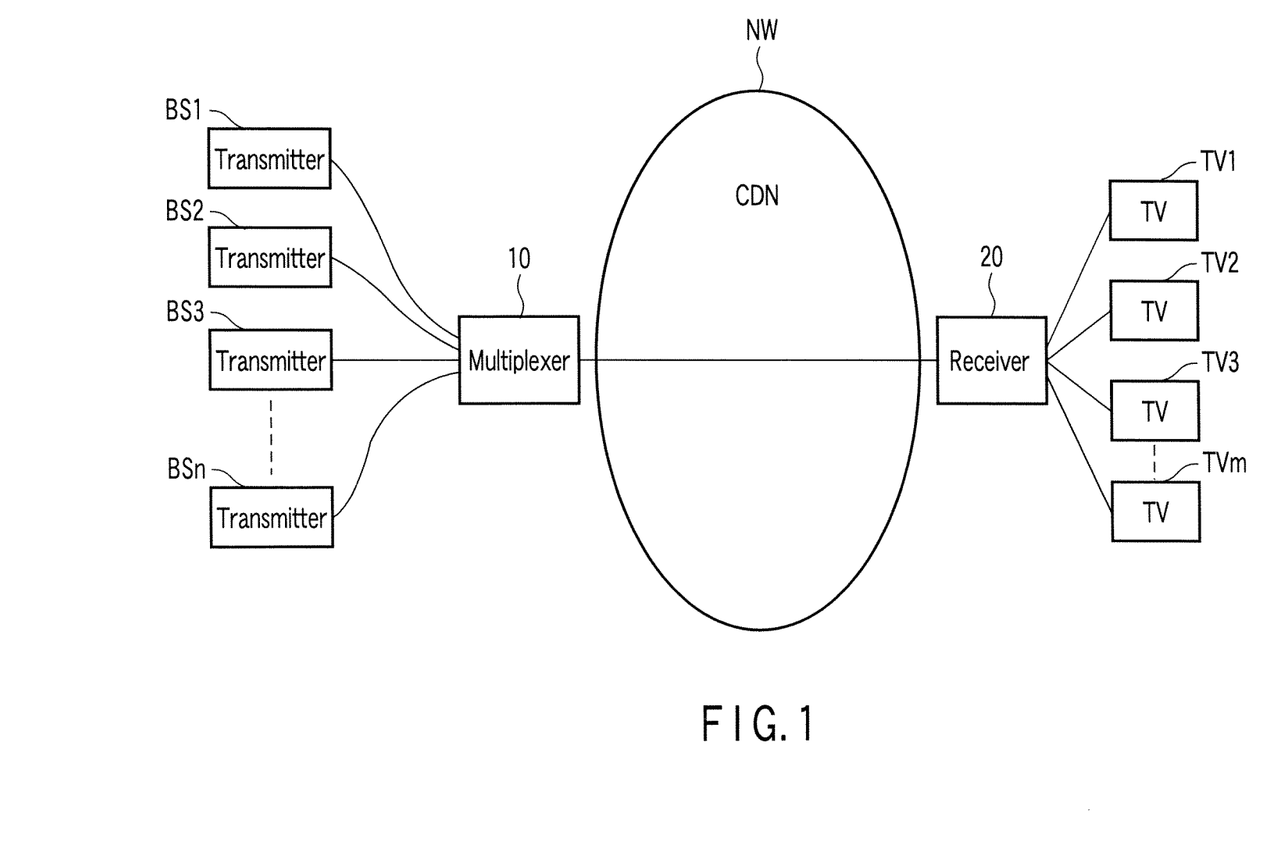
FIG. 1 is a diagram showing a general configuration of an IP broadcast system according to an embodiment of the invention.

FIG. 1 is a diagram showing a general configuration of an IP broadcast system according to an embodiment of the invention. Reference characters BS1 to BSn (n: natural number) designate transmitters installed for the respective broadcast stations or service providers, characters TV1 to TVm (m: natural number) television (TV) receivers.

First, the transmitters BS1 to BSn transmit by converting broadcast programs independent of each other from the TS to RTP packets for network (CDN) transmission. These RTP packets are supplied to a multiplexer 10, which in turn multiplexes a plurality of RTP packets and, thus generating a Ethernet (registered mark) frame specified for IP network transmission, sends out the Ethernet (registered mark) frame to the network NW.

The Ethernet (registered mark) frame is sent to a receiver (sets of STB (set-top box) and the existing TV receiver) 20. The receiver 20 has arranged therein TV receivers TV1 to TVm through a wired or a wireless channel. The receiver 20 receives the Ethernet (registered mark) frame from the network NW and, in accordance with the select operation by a remote controller (not shown), for example, separates the TS packets of a selected program and outputs them to the TV receivers TV1 to TVm. In each of the TV receivers TV1 to TVm, the TS packets are demodulated and output by reproduction.

Figure 2:
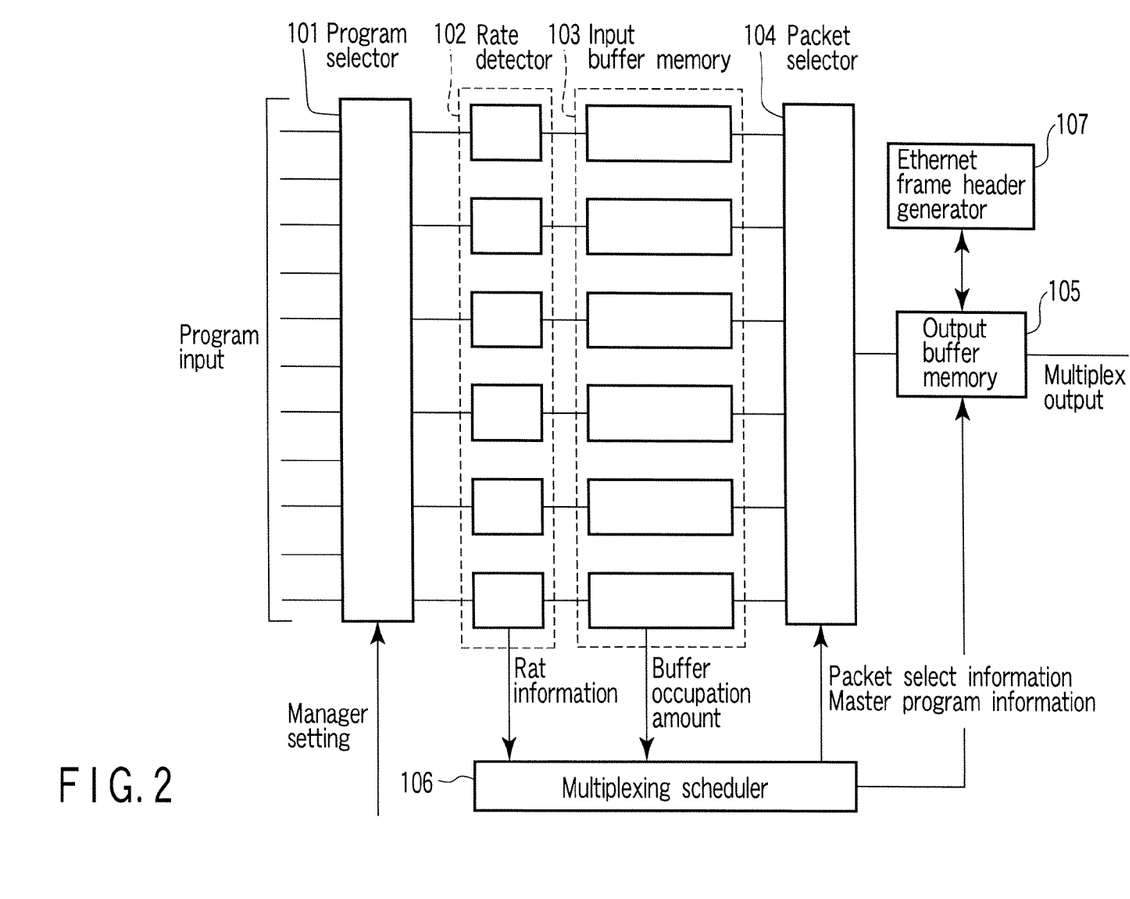
FIG. 2 is a block diagram showing a specific configuration of a multiplexer shown in FIG. 1.

FIG. 2 is a block diagram showing a configuration of the multiplexer 10.

Specifically, the multiplexer 10 includes a program selector 101, rate detectors 102, input buffer memories 103, a packet selector 104, an output buffer memory 105, a multiplexing scheduler 106 and a Ethernet (registered mark) frame header generator 107.

The RTP packets output from the transmitters BS1 to BSn are arbitrarily selected by the program selector 101, and with the rate detected for each program by the corresponding rate detector 102, supplied to and temporarily held in the corresponding input buffer memory 103.

The multiplexing scheduler 106 analyzes each RTP packet, based on the rate information for each program from the rate detectors 102 and the buffer occupancy amount for each program in the input buffer memories 103, and then transfers the corresponding RTP packet to the output buffer memory 105 by switching the packet selector 104. The Ethernet (registered mark) frame header generator 107 calculates the contents of the header section of the Ethernet (registered mark)

frame based on each RTP packets in the output buffer memories 105, and then writes the contents of the header section of the Ethernet (registered mark) frame in the output buffer memory 105.

The output buffer memory 105 generates and appropriately outputs the Ethernet (registered mark) frame by storing a plurality of RTP packets transferred from the input buffer memories 103 through the packet selector 104 and the header section of the Ethernet (registered mark) frame from the Ethernet (registered mark) frame header generator 107. In the process, the program including the highest transmission rate is determined as a master program, and a plurality of the corresponding RTP packets are multiplexed into a Ethernet (registered mark) frame at the rate equal to the product of the master program transfer rate and the number of programs.

Figure 3:
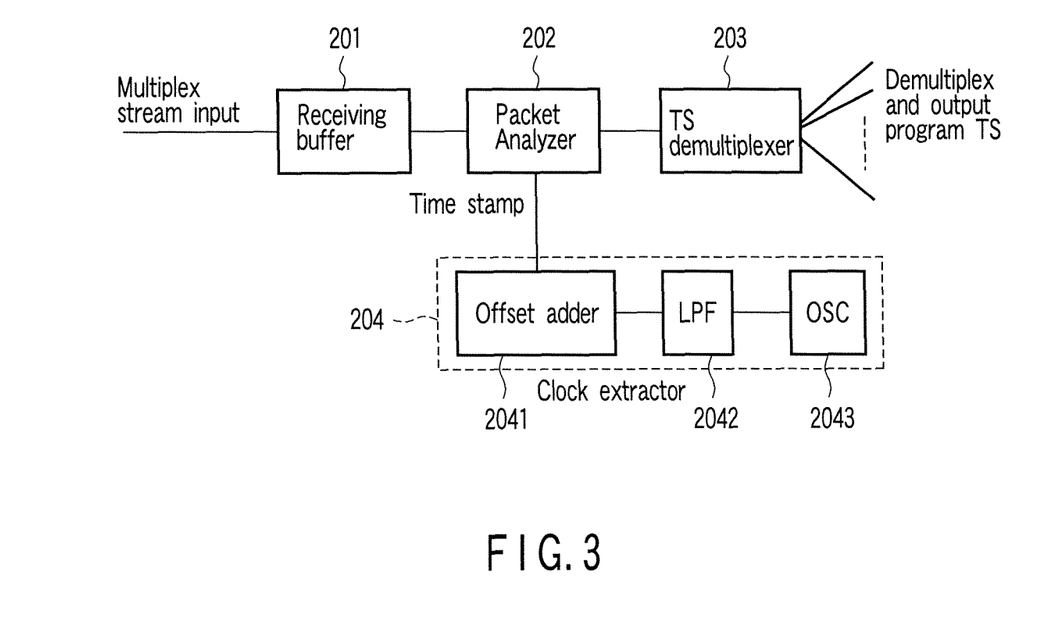
FIG. 3 is a block diagram showing a specific configuration of a receiver shown in FIG. 1.

FIG. 3 is a block diagram showing the configuration of the receiver 20.

In the receiver 20, the Ethernet (registered mark) frame that has arrived from the network NW is temporarily held in a receiving buffer 201. The Ethernet (registered mark) frame held in the receiving buffer 201 is introduced into a packet analyzer 202. The packet analyzer 202 analyzes the RTP packets, calculates the header contents of the Ethernet (registered mark) frame, and transfers the RTP packets to a TS demultiplexer 203 while at the same time outputting time stamp information constituting the header contents to a clock extractor 204.

The TS demultiplexer 203 separates a plurality of the TS packets from the input RTP packets, and outputs the result to the TV receivers TV1 to TVm.

In the clock extractor 204, on the other hand, an offset adder 2041, which holds the difference between the clock of the past master program and the clock of the present master program, adds the clock difference to a new time stamp as an offset. After that, the output of the offset adder 2041 is supplied, through an LPF 2042, to a clock oscillator (OSC) 2043 and each of the TV receivers TV1 to TVm as a program reproduction clock.

Next, the operation of the configuration described above will be explained.

Figure 4:
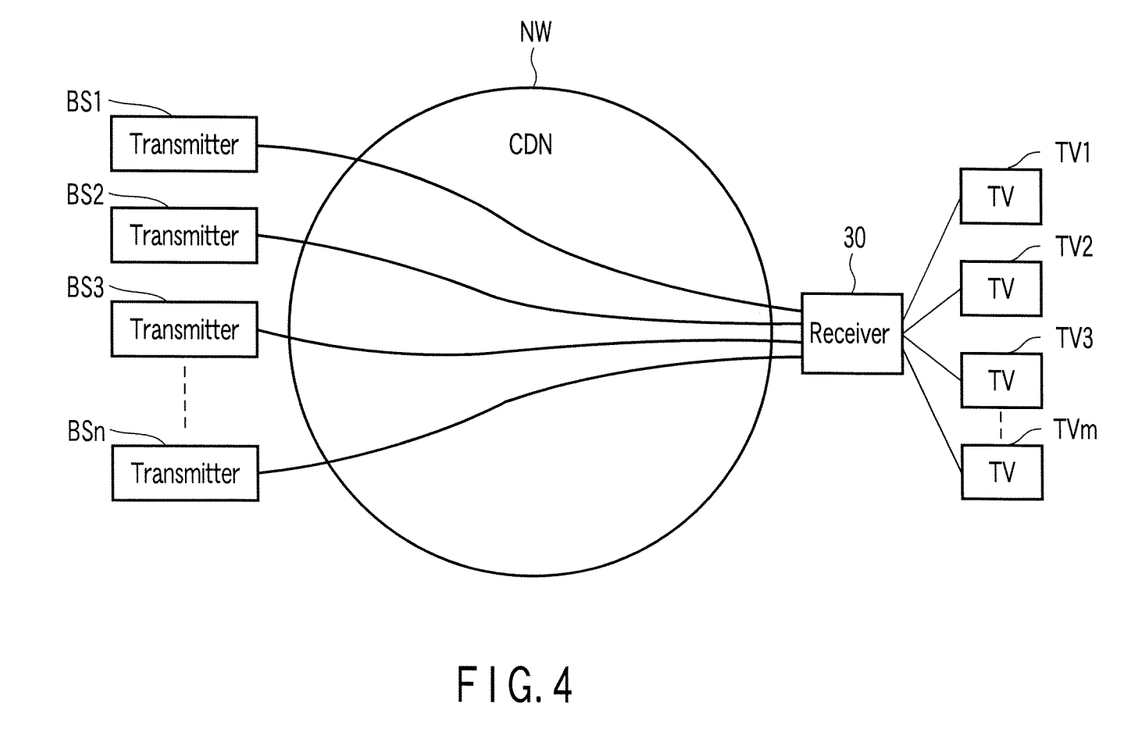
FIG. 4 is a diagram showing a general configuration of a previously conceived IP broadcast system.

FIG. 4 is a diagram showing the configuration of the previously-conceived IP broadcast system. In FIG. 4, the same component parts as those in FIG. 1 are designated by the same reference numerals, respectively, and not described again.

The data from the transmitters BS1 to BSn arrive at the receiver 30 as a plurality of independent streams on the network NW. The receiver 30 activates the network receiving devices in parallel in order to reproduce a plurality of programs at the same time. As a result, the circuit size is increased in hardware and so is the processing load in software, thereby necessitating a high-speed CPU.

The simultaneous reception of a plurality of programs has the advantages that the program switching speed is increased and the network band unified. In view of the fact that the previous program stream may not stop immediately at the time of switching the program, an attempt to receive only a program specified to be viewed would result in a plurality of program streams reaching the receiver 30 temporarily and causing the instability of the network band.

According to this embodiment, the data from the transmitters BS1 to BSn are multiplexed into a single stream by the multiplexer 10 and sent out as they are to the receiver 20.

Each program is input to the multiplexer 10 in the form of a RTP packet including plural MPEG2-TS packets of 188 or 204 bytes, and each RTP packet is configured of a maximum of 7 TS packets not to exceed the maximum frame length of 1518 bytes of the network NW.

Once the maximum frame length of the network NW is exceeded, the frame would be segmented into 1518 bytes or less to deteriorate the transmission efficiency. In the case where the transmission of the frame length having more than 1518 bytes called the Ethernet (registered mark) frame is tolerated in CDN, however, the transmission efficiency is improved by lengthening the frame to the maximum length on the network NW. This characteristic makes possible the transmission with the normal frame length before the multiplexer 10 and in the Ethernet (registered mark) frame only in CDN.

In the case where the maximum frame length tolerated in CDN is 9600 bytes, for example, the original six frames can be accommodated in one Ethernet (registered mark) frame. A conflict on the network NW would reduce the transmission efficiency. A small number of transmitters, therefore, causes the conflict less often for an improved efficiency and reduces the jitters of the time of arrival at STB due to queuing.

The program selector 101 is changed based on the program structure determined by the service provider. In the case where the broadcast contents are changed by area, the program selected is changed for each area, and the viewing can be limited by each stream designated for multiplexing in the access list of the router in the CDN.

The access list is for setting the router and determines which stream is to be distributed to which area. The packet selector 104 controls each packet so that a given packet staying for the longest time in the input buffer memory 103 is output in priority. By doing so, the multiplexing process can be executed with a minimum delay. The output buffer memory 105 suppresses a burst (short-time concentrated) output to prevent the overflow from the receiving buffer 201 of the receiver 20.

Figure 5:
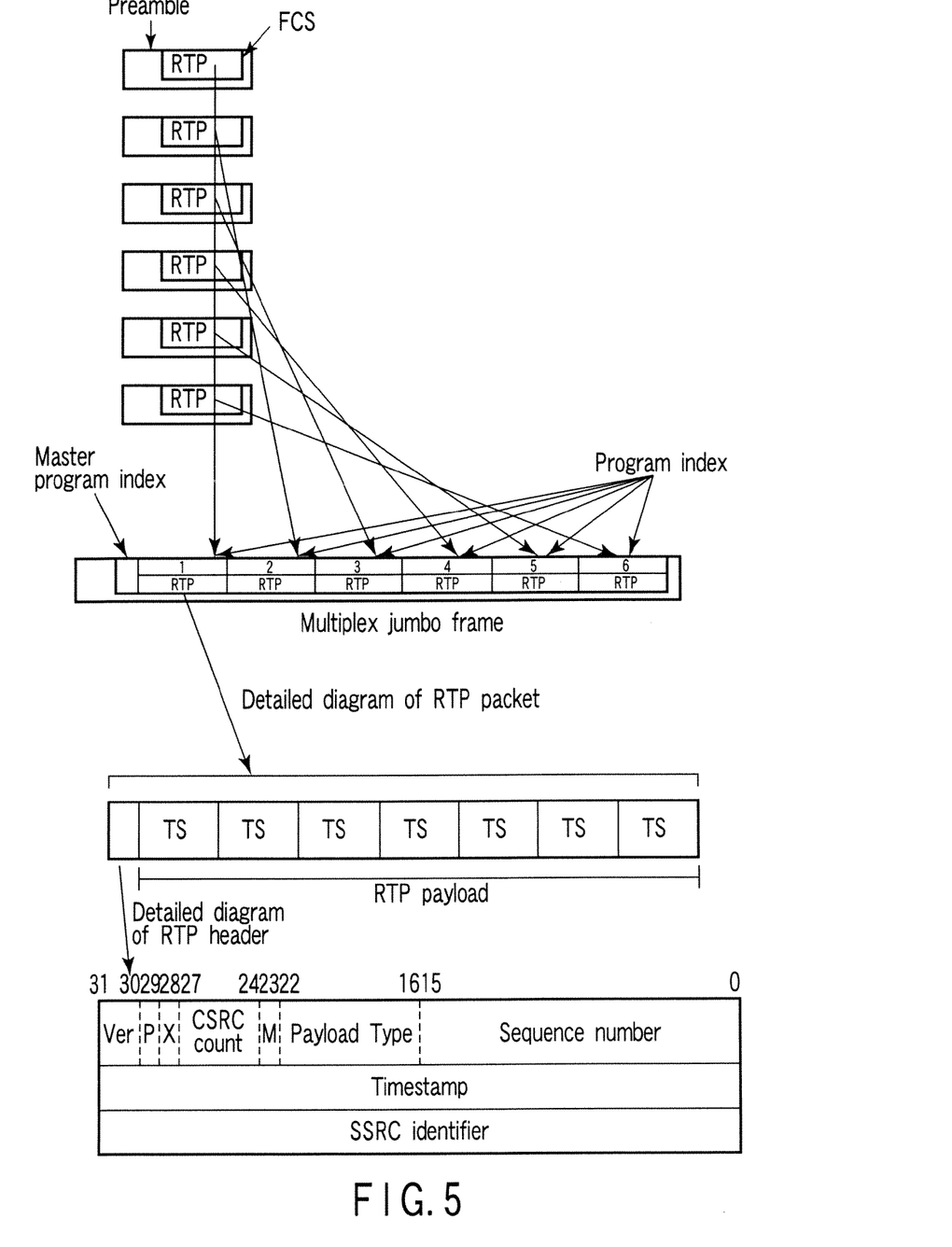
FIG. 5 is a diagram showing an example of the frame structure before and after multiplexing according to the same embodiment.

FIG. 5 shows an example of the frame structure before and after the multiplexing process.

The Ethernet (registered mark) frame is generally standardized according to IEEE802.3, and from the front end, configured of a header section, a data section and an frame check sequence (FCS) in that order. The header section is configured of a preamble, a destination address, a transmitter address and the length. The data section is configured of RTP packets. A plurality of TS packets are stored in a payload section of the RTP packet. The header section of the RTP packet has a Payload Type field and an SSRC field. By setting these fields for each program, a particular program with which the RTP packet is associated can be identified. The programs, if identical in input rate, can be arranged and multiplexed sequentially from the RTP packet head. Incidentally, a master program index is attached at the head of the plurality of RTP packets.

In the long term, however, a measure against the accumulation of input rate errors is required. The multiplexing rate, therefore, is set in accordance with the program having the highest input rate, and a dummy data is output for the deficient program portion. The program having a determined output rate as a master program is indicated at the head of the data section, thereby permitting the receiving end to judge which time stamp is to be referred to.

Figure 6:
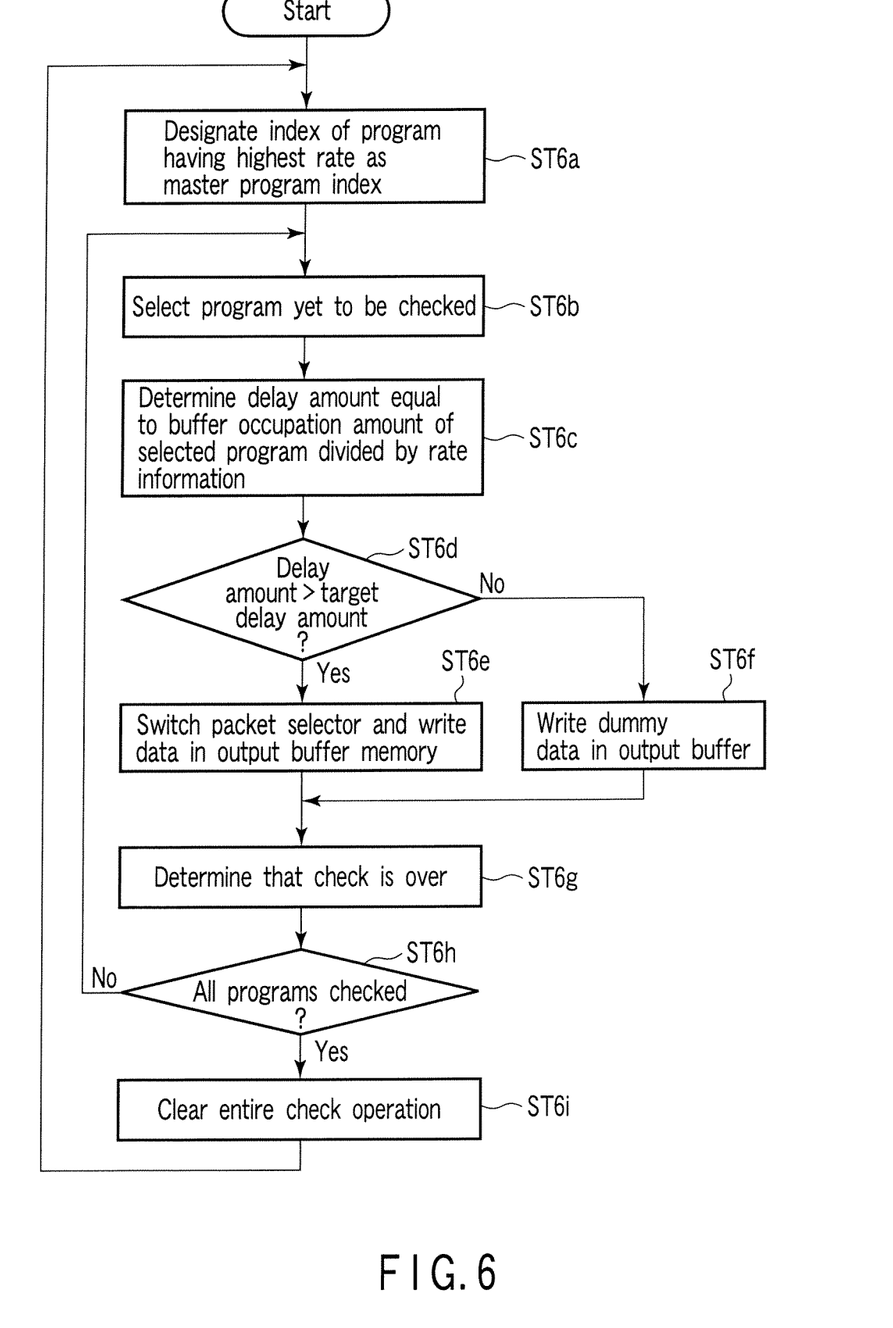
FIG. 6 is a flowchart showing the processing steps of a multplexing scheduler according to the same embodiment.

FIG. 6 is a flowchart showing the processing operation of the multiplexing scheduler 106.

The multiplexing scheduler 106 determines the index of the program having the highest rate as a master program index from the rate information by program obtained from the rate detector 102 (step ST6*a*) and then selects a program yet to be checked (step ST6*b*). Then, the buffer occupation amount divided by the rate information of the input buffer memory 103 holding this selected program is calculated thereby to determine the delay amount (step ST6*c*).

The multiplexing scheduler 106 then judges whether the delay amount of the selected program is larger than the target delay amount or not (step ST6d). In the case where the delay amount of the selected program is larger than the target delay amount, i.e. the delay amount determined from the jitter amount of each input program (YES), the multiplexing scheduler 106 switches the packet selector 104 and writes by transferring the corresponding RTP packet to the output buffer memory 105 (step ST6e).

In the case where the delay amount of the selected program is not larger than the target delay amount (NO), on the other hand, the multiplexing scheduler 106 writes dummy data in the deficient portion of the output buffer memory 105 (step ST6f). After that, the multiplexing scheduler 106 determines that the selected program has been checked (step ST6g), and judges whether all the programs held in the input buffer memory 103 have been checked or not (step ST6h). In the case where they have not yet been completely checked (NO), the multiplexing scheduler 106 executes the process of steps ST6b to ST6h repeatedly until all the programs have been completely checked. Upon complete checking of all the programs (YES), the multiplexing scheduler 106 clears the entire check operation (step ST6i), followed by transferring to the process of step ST6a. After the Ethernet (registered mark) frame header generator 107 writes the contents of the header section of the Ethernet (registered mark) frame in the output buffer memory 105.

The receiver 20 reproduces by extracting the TS for each program from the multiplexed streams. In the case where the programs are multiplexed in fixed order by the multiplexer 10, the processing is a simplified one to read from a predetermined position. For reproduction, however, the clock is required to be extracted from the time stamp of the RTP header. In the case where the master program determined on the multiplexer 10 side is changed, therefore, the time stamp referred to is changed on the receiver 20 side.

Incidentally, the repeated clock extraction causes the provisional suspension of the receiving operation. Thus, the difference between the clock of the past master program and the clock of the present master program is held in the offset adder 2041, and added as an offset to the new time stamp. In this way, the receiving operation is continued without repeating the clock extraction. The LPF 2042 is used for absorbing the clock jitters and can absorb the shock of the change in the master program as well as the fluctuation of the network. The dummy data inserted in the multiplexer 10 is discarded at the time of receiving operation.

As described above, according to this embodiment, the RTP packet including the TS of a plurality of programs is held for each program in the input buffer memory 103 of the multiplexer 10, and the multiplexing scheduler 106 reads the RTP packet of an arbitrary program from the corresponding input buffer memory 103 by switching the packet selector 104. The RTP packet is then stored in the output buffer memory 105 and coupled to the data section of the Ethernet (registered mark) frame. Further, the data of the header section of the Ethernet (registered mark) frame is generated from the RTP packets and stored in the output buffer memory 105 by the Ethernet (registered mark) frame header generator 107. Thus, the Ethernet (registered mark) frame is generated and sent out to the receiving device. Specifically, the delay between the plural programs is minimized at the transmitting end, and therefore, the programs can share the receiving buffer 201 and the clock extractor 204 in the receiving device 20.

In the case where the TS of plural programs is broadcast through the network NW, therefore, the throughput of the network NW can be improved while at the same time eliminating the need of preparing separate reproduction units for the programs at the receiving end. As a result, the multiplexer 10 is simplified, and the receiving process of the receiver 20 at the receiving end can be unified.

Also, according to this embodiment, plural RTP packets are multiplexed in the Ethernet (registered mark) frame together with the master program having the highest transmission rate at the transmitting end, and therefore, the clock extractor 204 of the receiver 20 is simply required to refer to the time stamp of the master program.

Further, in the multiplexer 10 according to this embodiment, multiplex transmission is possible by changing the combination of plural programs for each receiving area. Therefore, not only can the optimum broadcast service be realized for each receiving area but also the viewing can be limited for each receiving area.

The invention, though explained above with reference to an embodiment, is not limited to this embodiment, but can be embodied by modifying the component elements without departing from the spirit and scope of the invention. Also, various inventions can be achieved by appropriately combining the plural component elements disclosed in the aforementioned embodiment. For example, several ones of all the component elements included in the embodiments may be deleted.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An internet protocol (IP) broadcast system comprising:
a transmitting side which converts a plurality of transport streams (TSs) into a plurality of real-time transport protocol (RTP) packets for IP network transmission, and transmits the converted plurality of RTP packets to a broadcast network on an IP network, the TS including packet structures different in program and reproduction clock, wherein the transmitting side comprises a multiplexer which multiplexes the converted plurality of RTP packets to generate a standardized multiplex frame including at least a header field and an information field, and wherein the multiplexer comprises:
a plurality of input buffers configured to temporarily store the plurality of RTP packets for each program;
a rate detector which detects a transmission rate of each of the plurality of RTP packets;
an arithmetic unit to determine a delay amount based on a buffer occupation amount of each of the plurality of input buffers, and read out the plurality of RTP packets from the corresponding plurality of input buffers based on the delay amount, wherein the arithmetic unit determines a program including the highest transmission rate as a master program among the plurality of programs based on a detection result of the rate detector, and multiplexes a plurality of corresponding RTP packets at a rate equal to a product of the transmission rate of the master program and the number of programs;

a header generator which generates data of the header field of the multiplex frame based on the plurality of RTP packets; and
an output buffer which stores the plurality of RTP packets and the data in the header field of the multiplex frame to output the multiplex frame; and
a receiving side which receives the plurality of RTP packets from the broadcast network, extracts a reproduction clock from each of the plurality of RTP packets, and reproduces a program from the TS in each of the plurality of RTP packets based on the reproduction clock, wherein the receiving side comprises:
a buffer which temporarily holds the multiplex frame received from the broadcast network; and
a program reproducer which retrieves and analyzes the multiplex frame from the buffer, extracts the reproduction clock shared by the plurality of programs, demultiplexes a plurality of TSs for each program from the multiplex frame and reproduces the program from each TS based on the reproduction clock.

2. The IP broadcast system according to claim 1, wherein the program reproducer executes a reproduction process by extracting the reproduction clock of the master program.

3. The IP broadcast system according to claim 1, wherein the multiplexer changes the combination of a plurality of programs to be multiplexed, in accordance with a receiving area.

4. A multiplexer used on a transmitting side of an internet protocol (IP) broadcast system, the transmitting side converts a plurality of transport streams (TSs) into a plurality of real-time transport protocol (RTP) packets for IP network transmission, and transmits the plurality of RTP packets to a broadcast network on an IP network, the plurality of TSs including packet structures different in program and reproduction clock, the multiplexer comprising:
a frame generator which generates a standardized multiplex frame including at least a header field and an information field by multiplexing the plurality of RTP packets,
wherein the frame generator comprises:
a plurality of input buffers which temporarily hold the plurality of RTP packets for each program;
a rate detector which detects a transmission rate of each of the plurality of RTP packets;
an arithmetic unit to determine a delay amount based on a buffer occupation amount of each of the plurality of input buffers, and read out the plurality of RTP packets from the plurality of corresponding input buffers based on the determined delay amount, wherein the arithmetic unit determines a program including the highest transmission rate as a master program among the plurality of programs based on a detection result of the rate detector, and multiplexes a plurality of corresponding RTP packets at a rate equal to a product of the transmission rate of the master program and the number of programs;
a header generator which generates data of the header field of the multiplex frame based on the plurality of RTP packets; and
an output buffer which stores the plurality of RTP packets and the data in the header field of the multiplex frame, to output the multiplex frame.

5. The multiplexer according to claim 4, wherein the frame generator changes the combination of a plurality of programs to be multiplexed, in accordance with a receiving area.

6. A receiving apparatus used on a receiving side of an internet protocol (IP) broadcast system, the IP broadcast system converts a plurality of transport streams (TSs) into a plurality of real-time transport protocol (RTP) packets for IP network transmission, and transmits the plurality of RTP packets to a broadcast network on an IP network, the TS including packet structures different in program and reproduction clock, wherein a transmitting side of the IP broadcast system comprises a multiplexer which multiplexes the converted plurality of RTP packets to generate a standardized multiplex frame including at least a header field and an information field, and wherein the multiplexer comprises:
a plurality of input buffers configured to temporarily store the plurality of RTP packets for each program;
a rate detector which detects a transmission rate of each of the plurality of RTP packets;
an arithmetic unit to determine a delay amount based on a buffer occupation amount of each of the plurality of input buffers, and read out the plurality of RTP packets from the corresponding plurality of input buffers based on the delay amount, wherein the arithmetic unit determines a program including the highest transmission rate as a master program among the plurality of programs based on a detection result of the rate detector, and multiplexes a plurality of corresponding RTP packets at a rate equal to a product of the transmission rate of the master program and the number of programs;
a header generator which generates data of the header field of the multiplex frame based on the plurality of RTP packets; and
an output buffer which stores the plurality of RTP packets and the data in the header field of the multiplex frame to output the multiplex frame;
the receiving apparatus comprising:
a receiving unit to receive a multiplex frame from the broadcast network, the multiplex frame including at least a header field and an information field by multiplexing the plurality of RTP packets in a multiplexer in a transmitting side of the IP broadcast system, wherein the multiplexer includes a plurality of input buffers, which temporarily hold the plurality of RTP packets for each program, and an arithmetic unit which determines a delay amount from a buffer occupation amount of each of the plurality of input buffers, and reads out the plurality of RTP packets from the plurality of corresponding input buffers based on the delay amount;
a buffer which temporarily holds the multiplex frame; and
a program reproducer which retrieves and analyzes the multiplex frame from the buffer, extracts a reproduction clock shared by the plurality of programs, demultiplexes the plurality of TSs for each program from the multiplex frame, and reproduces the program from each TS based on the reproduction clock.

7. The receiving apparatus according to claim 6, wherein the program reproducer executes a reproduction process by extracting the reproduction clock for the master program designated by the transmitting side.

8. A method of converting a plurality of transport streams (TSs) into real-time transport protocol (RTP) packets for internet protocol IP network transmission and transmitting the converted RTP packets to a broadcast network on the IP network, the TS including packet structures different in program and reproduction clock, the method comprising:
designating a program including the highest transmission rate as a master program among a plurality of programs to be transmitted to the broadcast network;

detecting a transmission rate of each of the plurality of RTP packets;

determining a delay amount for the master program and for each of a plurality of programs following the master program, wherein the determining comprises determining a program including the highest transmission rate as a master program among the plurality of programs based on a detection result of the detecting, and multiplexing a plurality of corresponding RTP packets at a rate equal to a product of the transmission rate of the master program and the number of programs;

judging whether the delay amount is larger than a target delay amount;

storing the plurality of the corresponding RTP packets in an output buffer with regard to the program including a delay amount larger than the target delay amount;

storing the plurality of the corresponding RTP packets and dummy data for a deficient part in the output buffer with regard to the program including a delay amount not larger than the target delay amount; and generating and outputting a standardized multiplex frame including at least a header field and an information field based on the plurality of RTP packets stored in the output buffer.

* * * * *